United States Patent [19]
Azar et al.

[11] Patent Number: 5,940,780
[45] Date of Patent: Aug. 17, 1999

[54] UNIVERSAL TRANSCEIVER

[75] Inventors: Kaveh Azar, Westwood; Mehmet Mustafa, Waltham, both of Mass.

[73] Assignee: Advanced Thermal Solutions, Inc., Newton, Mass.

[21] Appl. No.: 08/536,516

[22] Filed: Sep. 29, 1995

[51] Int. Cl.[6] .............................. G01D 1/00; G01D 11/00
[52] U.S. Cl. ............................. 702/91; 702/104
[58] Field of Search .................... 364/505, 506, 364/509, 510, 557, 558, 550, 551.01, 571.01–571.08; 702/85, 90, 91, 130, 104, 189, 121, 142, 126, 99; 73/1.01, 1.57, 1.16, 866.5; 324/76.11, 92

[56] References Cited

U.S. PATENT DOCUMENTS

| | | | |
|---|---|---|---|
| 4,558,426 | 12/1985 | Solt, Jr. ................................. | 364/580 |
| 4,949,299 | 8/1990 | Pickett ................................. | 364/900 |
| 5,335,186 | 8/1994 | Tarrant ................................. | 364/550 |
| 5,365,462 | 11/1994 | McBean, Sr. ...................... | 364/571.01 |
| 5,375,073 | 12/1994 | McBean ............................. | 364/571.01 |
| 5,526,287 | 6/1996 | French ................................. | 364/550 |

OTHER PUBLICATIONS

Technical Manual: Cambridge Aeroflo, Inc.; "Optimal Solutions ion Thermal and Airflow Technologies". date unknown.

*Primary Examiner*—Patrick Assouad
*Attorney, Agent, or Firm*—Synnestvedt & Lechner

[57] ABSTRACT

A device is disclosed for interfacing with a variety of transducer types to generate a measurement value of a certain property. The device has at least one sensor block that in turn has at least one sensor channel containing sensor circuitry. The sensor circuitry is configured to cooperate with a particular transducer to generate an electrical signal representing the property. Connected to the sensor block is a control block. The control block has configuration circuitry for enabling the sensor circuitry. Additionally, the control block contains conversion circuitry for converting the signal to the measurement value using a conversion equation. A user interface provides the means for inputting configuration information and outputting the measurement value. In one embodiment, the sensor block also contains a multiplicity of sensor channels and multiplexing circuitry for enabling the control block to address each sensor channel individually. The device may also have a plurality of circuits in each sensor circuit. The configuration circuitry enables a selection of these circuits according to the transducer used and the measurement desired. This embodiment may also have conversion circuitry that is responsive to the configuration circuitry such that the conversion equation relates to the selection.

26 Claims, 6 Drawing Sheets

F.V.—Front View, S.V.—Side View, P.V.—Perspective View

UNIVERSAL TRANSCEIVER

BACKGROUND OF THE INVENTION

The invention relates generally to a device for interfacing with a transducer to measure a particular property such as temperature or velocity, and more specifically to a universal transceiver capable of interfacing with a multitude of different transducer types. A transducer converts one form of energy to another, and those that convert a measurable property to an electrical signal are of particular importance. Indeed, transducers such as thermocouples, thermistors, load cells, impellers, and tachometers are employed throughout the world in an infinite array of measurement applications.

Traditionally, a particular transducer type requires a certain type of control unit. Moreover, each unit typically interfaces with only one transducer. This quickly results in numerous control units even for a simple application. For example, in the testing of electrical circuit boards, the temperature and velocity of the air moving through the electrical components are important design considerations. To measure these properties, both anemometers (velocity) and thermistors or thermocouples (temperature) are ordinarily used. Most applications also mandate the use of numerous such transducers, and consequently numerous control units are required. With each control unit, however, comes its attendant cost, clutter, spare parts requirements, and esoteric intricacies. A need therefore exists for a device to control a multiplicity of various transducer types. The present invention fulfills this need.

SUMMARY OF THE PRESENT INVENTION

The present invention provides for a device for interfacing with a variety of transducer types to generate a measurement value of a certain property. The device has at least one sensor block that in turn has at least one sensor channel containing sensor circuitry. The sensor circuitry is configured to cooperate with a particular transducer to generate an electrical signal representing the property. Connected to the sensor block is a control block. The control block has configuration circuitry for enabling the sensor circuitry. Additionally, the control block contains conversion circuitry for converting the signal to the measurement value using a conversion equation. A user interface provides the means for inputting configuration information and outputting the measurement value. In one embodiment, the sensor block also contains a multiplicity of sensor channels and multiplexing circuitry for enabling the control block to address each sensor channel individually. The device may also have a plurality of circuits in each sensor circuit. The configuration circuitry enables a selection of these circuits according to the transducer used and the measurement desired. This embodiment may also have conversion circuitry that is responsive to the configuration circuitry such that the conversion equation relates to the selection.

The following objects, features and advantages are met by one or more embodiments of the present invention:

It is an object of the invention to provide a single device having sensor circuitry that can be configured to support a variety of different transducer types.

It is a further object of the invention to provide a device having a multiplicity of sensor channels for interfacing with a multiplicity of transducers.

It is a feature of the invention to provide multiplexing means for enabling a single device to address each sensor channel individually.

It is a further feature of the invention to have conversion means responsive to the configuration of the sensor circuitry such that the transducer signal is converted to a useful measurement value by the device It is yet another feature of the present invention that the sensor circuitry of each sensor channel may be configured differently such that a multitude of various transducer types may be supported by a single device.

It is an advantage of the present invention that a single device can support a multitude of different transducer types thus reducing cost, clutter, spare parts requirements, and esoteric intricacies.

These and other objects, features and advantages of the invention will be apparent to those skilled in the art upon consideration of the following description of the invention.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and wherein:

DETAILED DESCRIPTION OF THE PRESENT INVENTION

The present invention provides for a device that interfaces with any sensor having a transducer to generate useful measurement information of a desired property. The present invention thus eliminates the need to have a specialized transceiver unit for each transducer. Having one device that can interpret a multitude of different transducers finds application in research and engineering studies as well as in manufacturing processes.

Figure 1:
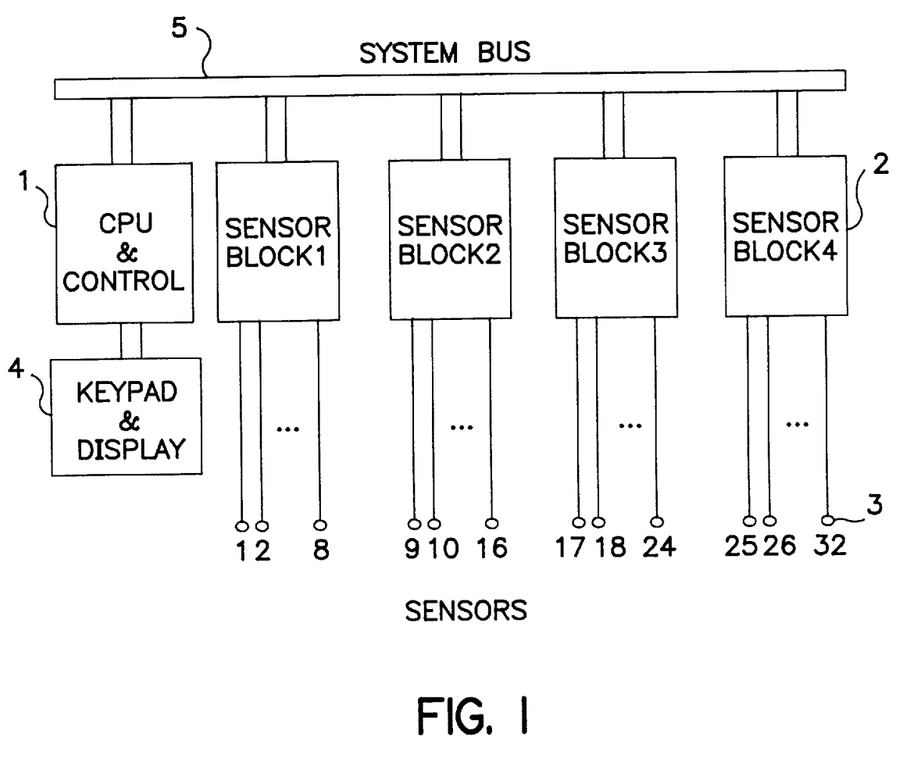
FIG. 1 shows a general block diagram of the major system components.

As shown in FIG. 1, the system comprises four major components—at least one sensor block 2, a control block 1, a user interface 4, and at least one sensor 3. The sensor block 2 has at least one sensor channel (not shown) which has sensor circuitry for cooperating with the sensor 3 to generate a signal representing a property for which the user is measuring. In a preferred embodiment, each sensor block is a discrete unit, readily installed, moved or replaced. The embodiment shown has four sensor blocks and thirty two sensors. To accommodate these sensors, a multiplicity of sensor channels is used; every sensor corresponds to a specific sensor channel. Moreover, the sensor block 2 may contain multiplexing means for enabling the control block 1 to address each sensor channel individually. The control block 1 is connected to the sensor block 2 via a system bus 5, although other connection means are suitable such as individual wires or ribbon cable. The control block 1 includes configuration means for enabling the sensor circuitry, and conversion means for converting the signal to a measurement value by applying a conversion equation to the signal. The user interface provides means for inputting configuration and calibration information and outputting the measurement value.

In examining each of these components in more detail, a specific embodiment of the invention is presented which measures both the temperature and velocity of a fluid using a single transducer having a temperature sensitive resistance. This embodiment demonstrates the versatility of the universal transceiver by changing the sensor circuitry configuration to obtain two readings from a single transducer. The sensor circuitry is based on hot and cold wire anemometry for measuring velocity and temperature respectively. For velocity measurement, the sensor circuitry is configured to energize the transducer and maintain it at a constant temperature. The heat transfer from the transducer is related to the velocity of the fluid moving past it. Therefore, the power supplied to the transducer to maintain its temperature is related to the rate of fluid flow. For temperature measurement, the sensor circuitry is configured to measure resistance since fluid temperature is related to transducer resistance. Hence, by configuring the sensor circuitry to measure either the energy consumption or resistance of a single transducer, the velocity or temperature of the fluid can be determined. It should be understood that the focus on the temperature/velocity embodiment herein is for illustrative purposes and should not be construed as a limitation of the invention.

Sensor Block

Each sensor channel of a sensor block must have sensor circuitry to support a particular transducer type to provide a signal representing a measurement of the desired property. In the preferred embodiment, the sensor circuitry contains a plurality of circuits for accommodating a wide range of transducer types. A selection of these circuits is enabled according to the particular transducer used and the desired measurement. For example, with passive resistive transducers, such as thermistors, a transducer driver circuit is needed to convert a change in resistance to voltage. This voltage is sampled and converted to a digital signal via an analog to digital converter (discussed below). On the other hand, passive capacitive transducers, such as audio microphones, respond by changing their capacitances. A modified version of the driver circuit is needed in this case where the capacitance is converted into voltage. Such circuitry is well known in the art of audio amplifiers. With active transducers that produce a voltage, there is no need for a driver circuit. Standard data acquisition techniques may be employed in this case. Finally, active transducers that produce a current require a precision resistor in the sensor circuitry. The current flowing in or out of the transducer goes through the resistor and generates a voltage across the resistor. In turn, this voltage is fed into a buffer and finally to an ADC.

In the preferred embodiment, a single block has sensor circuitry comprising a variety of circuits, each circuit designed for a particular transducer type. For example, the sensor circuitry may contain a driver circuit for measuring the resistance of a thermistor to determine temperature, and a passive circuit for receiving a voltage signal from a tachometer to determine revolutions per minute. The user enables either circuit via the configuration means in the control block 1. The configuration means also instructs the converting means what kind of signal it will be receiving, and the converting means can therefore apply the appropriate conversion equation to the signal. Due to the modular design of the sensor blocks, sensor blocks may be specialized for economical reasons. For example, one sensor block may have only passive circuits, while another has only driver circuits. Although this reduces costs by reducing the number of circuits in the sensor circuitry, it also reduces the flexibility of a particular sensor block. Thus, a balance must be struck between cost and flexibility when selecting the number and type of circuits to install in the sensor circuitry.

Figure 2:
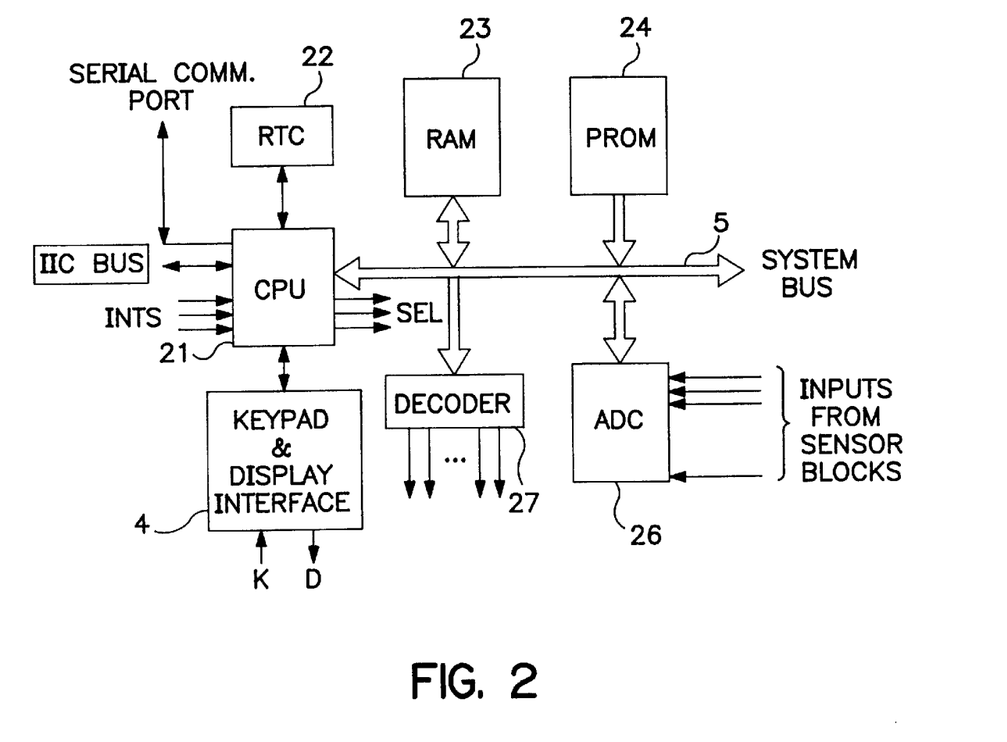
FIG. 2 shows a diagram of the control block.
Figure 3:
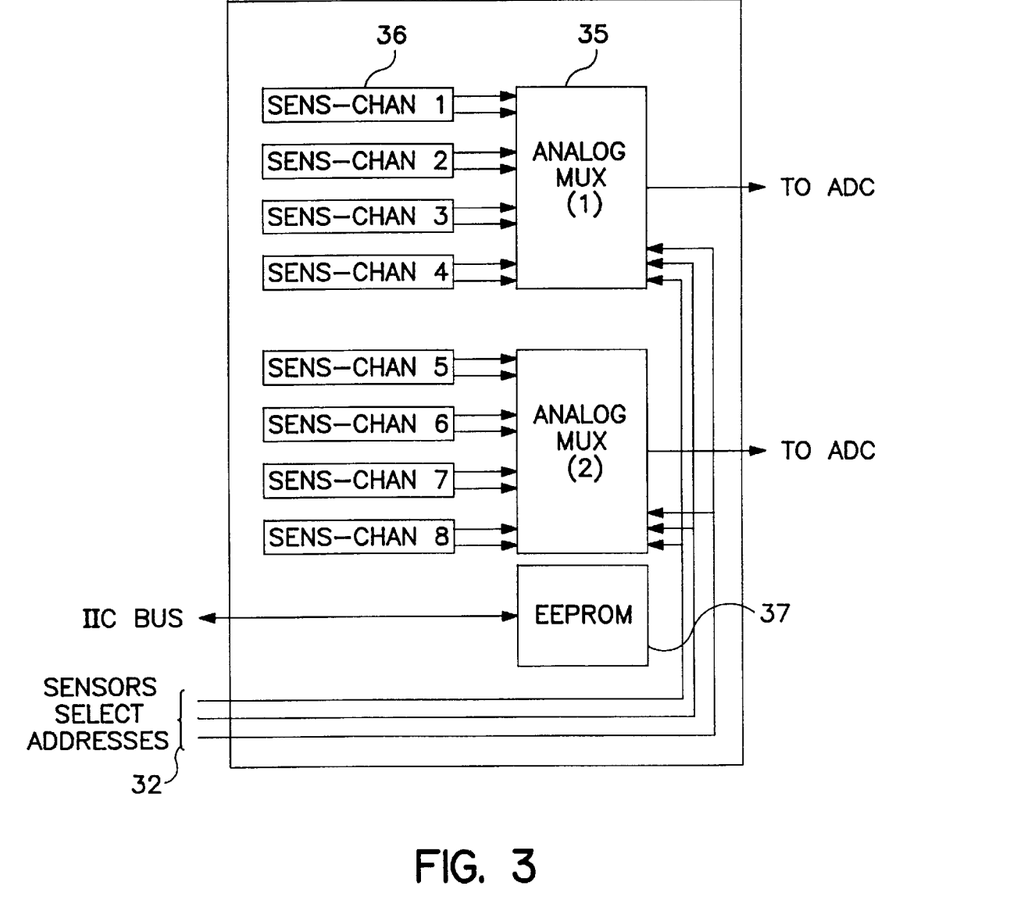
FIG. 3 shows a diagram of a sensor block.

The sensor block for the temperature/velocity embodiment is shown in FIG. 3. In this embodiment, the sensor block comprises two identical sub-circuits, each having an analog multiplexer 35, and each multiplexer 35 accommodating four individual sensor channels 36. Each sensor channel 36 is shown with two output signals. One of these signals represents the fluid's temperature at the site of the sensor and the other represents its velocity. The analog multiplexer 35 is an eight-to-one selector which assigns an address to each sensor channel. When the control block seeks either temperature or velocity data from a particular sensor, it sends a binary signal to the multiplexer corresponding to the address of that particular sensor via address inputs 32. For example, if the control blocks seeks temperature data from a sensor, and that sensor has a sensor channel binary address of 101, the control block 1 would output such an address request 32 to the multiplexer 35. Using its switching capabilities, the multiplexer 35 would then output a signal from the sensor channel corresponding to the fluid's temperature—providing, of course, that the sensor circuitry was properly configured for temperature measurement. It should be understood that all multiplexers 35 are driven simultaneously and in parallel by these address lines, and further, it is possible that a sensor channel on each multiplexer may have the same address. All sensor channels having the same address within a sensor block(s) 2 will respond by outputting their signals via the multiplexers 35 to the ADC 26 (see FIG. 2). Thus, in a system having four sensor blocks 2, each sensor block having two multiplexer, and each multiplexer having at least one sensor channel, the ADC can receive up to eight signals for a single address query. The controlling firmware can exploit this and make eight consecutive measurements.

FIG. 3 also depicts an EEPROM 37 block connected to the IIC BUS. This is a serial EEPROM which is used to contain transducer specific data and parameters. One skilled in the art will realize that the EEPROM 37, like many of the components, may be located in either the sensor block or control block, and its elected placement should not be used to limit the scope of the invention. The EEPROM 37 in this Figure is depicted as part of the sensor block 2 due to its natural association with the senors. That is, a sensor block 2 and its associated transducers may be purchased, installed, or replaced as a unit, allowing the calibration constants of certain transducers to be loaded into the EEPROM 37. This enables a user to swap entire sensor blocks and their transducers without recalibration. Since the transducer calibration constants vary between transducers, once a group of eight transducers are connected to a sensor block 35 and their constants stored in the EEPROM 37, It is advisable to keep the transducers connected to that particular sensor block 2. Otherwise, the user must enter new calibration constants for the transducers. Calibration constants may be entered in a variety of ways such as via a key-pad, a modem, a floppy drive, or the serial communication port of the system using a personal computer. Preferably, the calibration and configuration information are in ASCII text format permitting editing for convenience before transmission to the system.

Figure 4:
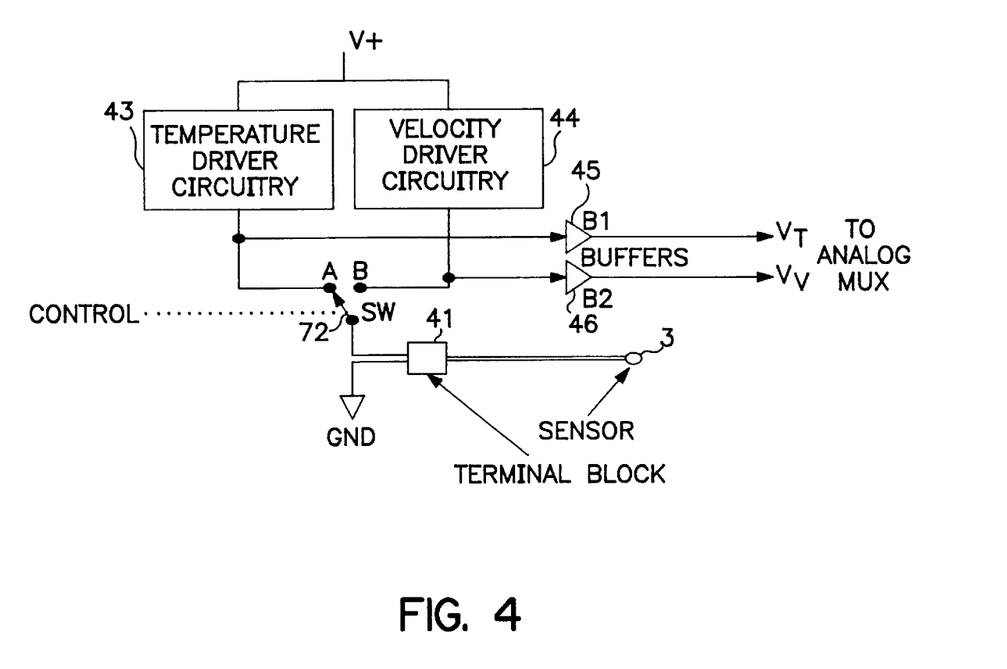
FIG. 4 shows a diagram of a sensor channel.

In FIG. 4, the structure of one of the sensor channels is depicted. The sensor 3 connects to the terminal block 41 in any traditional manner, although using screws is preferred for mechanical stability. The terminal block 41 is electrically connected to the common side of a switch 42. The switch 42 is controlled by the configuration means (FIG. 2, discussed below ). As shown, the switch is contacting the A terminal, which connects the temperature driver circuit 43 to the sensor 3. Alternately, the switch may be in the B position in which the velocity driver circuit 44 is connected to the sensor 3. Buffers 45 and 46 connect to the A and B terminals of switch 42 respectively. The buffers are essentially a scale adjustment amplifier implemented using traditional operational amplifier circuitry. The outputs from buffers 45 and 46 are voltage signals, $V_T$ and $V_V$ respectively, representing the temperature and velocity of the fluid at the transducer's location. These two outputs are connected to the analog multiplexers, and it should be obvious that only one output has meaning at any one time. The depicted embodiment accommodates 32 transducers, all of which may be configured using the system firmware to perform temperature or velocity measurements, or both. The control firmware also monitors the selected mode.

Figure 5:
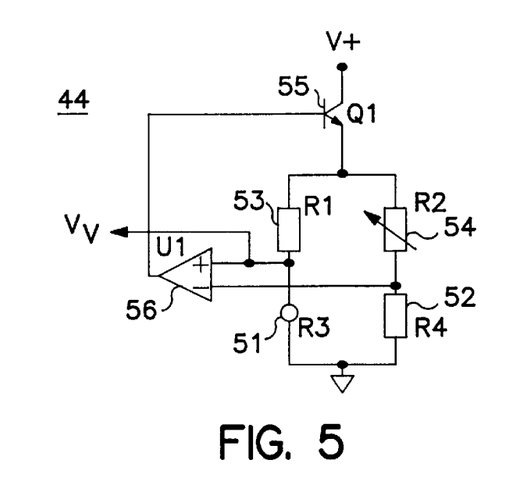
FIG. 5 shows a diagram of a velocity driver circuit.

FIG. 5 provides detail on the velocity driver circuit 44. The velocity driver circuit 44 is based on the principle that if a hot component is placed in a fluid flow, it looses heat and thus its temperature diminishes. If a means is found to keep the temperature of the component constant, then the additional energy required to maintain the constant temperature is related to the flow rate of the fluid. An ordinary bridge circuit with feedback is used to maintain a transducer at a constant temperature. In FIG. 5, the essential components of the bridge feedback circuitry are depicted. One leg of the bridge circuit contains the thermally sensitive transducer 51 positioned in the fluid flow to be measured. When the bridge is balanced, the voltage difference at the input of the operational amplifier 56 is zero. If the flow rate of the fluid increases, the resistance of the thermally sensitive transducer 51 changes causing the bridge to become unbalanced. This in turn results in a non zero input voltage at the operational amplifier 56, which changes the voltage at the base of the transistor 55. This affects the current flow through the thermally sensitive transducer 51. For example, if the transducer is configured such that an increase in fluid flow, decreases its resistance, then current must be increased to maintain the constant temperature. Therefore, if the voltage across the transducer is monitored, a voltage increase corresponds to a fluid flow increase.

Figure 6:
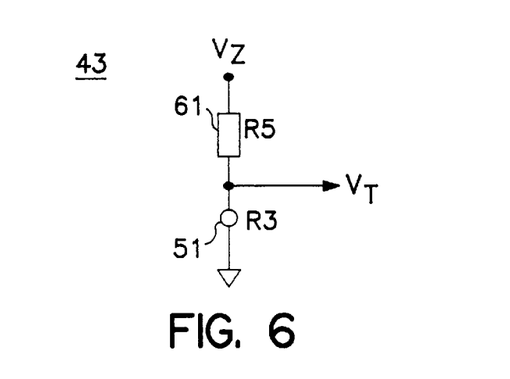
FIG. 6 shows a diagram of a temperature driver circuit.

The temperature driver circuit 43, shown in FIG. 6, is based on the principle that as the temperature of a transducer changes, so does its resistance. If the change in resistance is monitored, the temperature about the transducer may be calculated. The same transducer in the velocity circuit 44 may also be used in a temperature driver circuit 43 as shown in its basic configuration in FIG. 6. In the FIG. 6, $V_Z$ represents a stable and accurate voltage source and transducer 51, as before, is a transducer having a thermally sensitive resistance, e.g. a thermistor.

Figure 7:
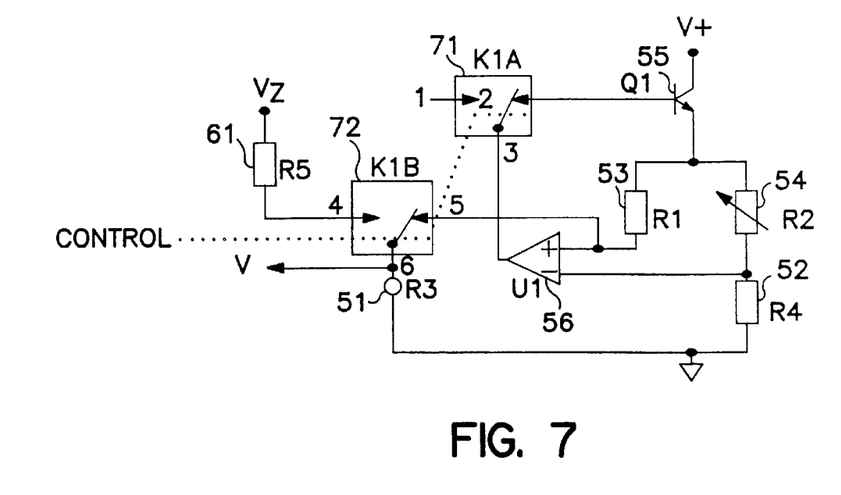
FIG. 7 shows a diagram of a combination of the velocity and temperature driver circuits;.

The temperature and velocity driver circuits 43, 44 may be combined using a relay that is controlled by firmware to select either circuit while keeping the transducer as a common element. One embodiment of this circuit is shown in FIG. 7. Two halves of a relay 71 and 72 are controlled by a switch signal from the CPU 21 (FIG. 2). For example, when the relay is not energized, it contacts terminals 3 and 5 (as biased in this embodiment) to energize the velocity driver circuit 44. When the switch signal is driven to energize the relay, the common leads of the relay will be connected to terminals 1 and 4 of the two halves of the relay 71, 72. This configuration disconnects the transducer from the bridge and breaks the feedback path and simultaneously connects it to the precision voltage $V_Z$ and the resistor 61 making it ready for temperature measurements.

Control Block

The control block essentially configures the sensor circuitry, interrogates the sensors, and converts the sensors' signals to useful measurement data. In the embodiment of FIG. 2, the control block comprises a CPU 21, a real time clock (RTC) 22, a decoder 27, an analog to digital converter (ADC) 26, and memory components such as the random access memory (RAM) 23 for storing transducer data and the read only memory (PROM) 24 for storing the firmware. Preferably, this block is composed of off-the-shelf components to reduce costs and increase the availability of spare parts.

The CPU configures the driver circuitry by enabling certain circuits within it. In the temperature/velocity embodiment, the CPU enables either the temperature driver circuit or the velocity driver circuit. Because only two circuits exist, the CPU can switch between the circuits with a single binary digit; e.g., "1" turns the temperature driver circuit on and the velocity driver circuit off, and "0" has the opposite effect. The CPU performs this task using a simple 8 digit shift register wherein each digit corresponds to a sensor channel of a given sensor block. It should be apparent to one skilled in the art, however, that other switching mechanisms may be employed such as using the switching capability of the multiplexer.

Under normal operation, when the device is instructed to interrogate a selection of sensors, the CPU outputs a selection (SEL in FIG. 2) corresponding to the address of a particular sensor channel to be scanned. If the sensor is to sample only the temperature or the velocity at a location, the activation of the appropriate circuitry is done only once just before the run begins. On the other hand, if the sensor is configured to sample both the velocity and the temperature at the same site, the selection of the appropriate circuitry is done dynamically. That is, if a particular sensor is assumed to be in a dual mode, then when the control firmware scans this sensor it takes a reading of the voltage with whatever circuitry is presently enabled. Assuming that the previous scan left the sensor channel with the velocity driver circuitry enabled, a velocity reading is taken. Then, the temperature circuitry is activated permitting the reading of the temperature at the site. The control firmware keeps track of sensor channel's mode during the previous scan, and therefore during the subsequent scan it knows which circuitry is active.

The 8-input ADC 26 can be instructed by the system firmware to digitalize on demand any one of its eight input lines from the multiplexers 35 (see FIG. 3, discussed above). These inputs carry the analog voltages representing the velocity or temperature of the fluid at the location of the sensor that is being scanned. The CPU applies a conversion equation to the ADC's digitalized output to generate useful measurement information. As discussed below, the conversion equation depends upon the desired measurement and upon the particular transducer involved. In the present embodiment, each sensor channel has a data structure in the RAM 23 where a certain number of recent temperature and velocity readings are kept. The CPU 21 performs digital filtering or smoothing of this data using traditional techniques to provide the suer with more useful and meaningful information.

This particular embodiment offers several options for data storage. In addition to storing data for filtering and smoothing, the RAM 23 may be configured to capture the actual measurement data. The present embodiment also has a floppy drive for downloading, although a hard drive or tape drive would function equally as well. As shown in FIG. 2, a serial communication port connected to the CPU 21 provides yet another avenue for data transfer and storage. This communication line permits the user to collect data electronically in a stand alone computer or printer for further processing and documentation. Additionally, this link allows the transducers to be configured and calibrated via an external computer. A modem may also be used for remote access to the device. An alternative to the hard wire link are wireless ports such as infrared or radio frequency communication devices. In addition to storing data via the wireless connection, the connection may be used for programming the system as well. It should be apparent to one skilled in that art that many other data storage configuration and means are possible.

The conversion equation used by the CPU to convert the digitized signal into a useful measurement value is determined by calibrating the output of a transducer to known measurement values. To this end, under controlled and measured conditions, properties like temperature and atmospheric pressure are varied to produce various transducer signals. A conversion equation is then generated to reconcile the various signals to the known measurement values. The conversion equation may be generated using any traditional curve fitting or least squares algorithm or other known technique. Calibrating the signal may be performed either in the device using calibration means, or independently, using traditional testing/calibration equipment. If done independently, the values for the calibration constants, and perhaps the general equations, are determined through traditional calibration or curve fitting techniques, and either entered into the device via the operator interface or downloaded from a personal computer or similar device using the IIC Bus or modem. In one embodiment, the constants are stored in the EEPROM 37 as shown in FIG. 3. If the calibration is performed using the calibration means, the firmware instructs the CPU to gather data from a transducer and coordinates this data with accurate readings from a previously calibrated transducer. The previously calibrated transducer may be a stand-alone sensor that inputs data through IIC Bus, or it may display data that is in turn entered via the user interface, or it may be another sensor on the sensor block that has reliable output. Indeed, there are many possible configurations for receiving actual data for calibrating a transducer that will be readily apparent to one skilled in the art.

Taking for example the temperature/velocity embodiment of the invention, the transducer is placed in a controlled environment and the velocity of the fluid and its temperature is varied. The voltage across the transducer is noted at each property. Using standard curve fitting software, a polynomial equation 1 for converting voltage across a transducer to a fluid rate is generated as follows:

$$s = (K_1 V^2_T + K_2 T + K_3)^2 \quad (1)$$

wherein s represents the velocity of the fluid, $K_{1, 2, \text{ and } 3}$ are calibration constants, T represents the temperature of the fluid, and $V_T$ is the voltage across the transducer. In one embodiment, several such conversion equations are generated at different transducer temperature levels such that the transducer temperature can be adjusted to remain above the fluid's temperature (discussed below). Although temperature is integrated into this conversion equation, it may nevertheless be considered after the conversion occurs as is traditionally done. That is, a liner equation is typically used wherein velocity is a function of temperature.

As with the velocity conversion equation, a temperature equation is generated based upon the voltage across the transducer for various known temperatures. The voltage V across the transducer is related to its resistance by Equation 2 as follows:

$$R_T = R_5 \left( \frac{V_T}{V_Z - V_T} \right) \quad (2)$$

where $R_5$ represents the resistance of the Resistor 61 (see FIG. 6), and $V_z$ represents a constant voltage source (generated by the temperature driver circuit). Thus, from the measurement of $V_T$ and knowledge of $R_5$ and $V_Z$, one can compute the resistance $R_T$ of the transducer. The temperature of the thermistor is related to its resistance by Equation 3 as follows:

$$T = a + bR_T + cR_T^2 + \frac{d}{\sqrt{R}} \quad (3)$$

where $R_T$ is the transducer's resistance, and a, b, c, and d are calibration constants. Again, a standard curve fitting algorithm may be employed to determine the constants. From Equations 2 and 3, the temperature T of the fluid in which the transducer is immersed can be computed. First, a reading is taken of the thermal voltage $V_T$ of the transducer under very low power dissipation conditions. Then, the resistance is computed and substituted into Equation 4. The temperature is plugged into Equation 1 to determine the fluid flow rate.

In its preferred embodiment, the sensor block comprises a modular unit having specific transducers associated with it as well as local memory means (EEPROM 37, see FIG. 3) for storing the calibration constants of the transducers. This embodiment enables the memory means to be pre-loaded with calibration constants. Likewise, the firmware may come complete with an array of general conversion equations. When the user configures a particular sensor channel for a particular measurement, the CPU uploads the appropriate equation and queries the EEPROM for the appropriate calibration coefficients. For example, if a user of the temperature/velocity embodiment configures the sensor circuitry for temperature, the CPU would upload Equation 3 and query the EEPROM for the a, b, c, and d coefficients.

In yet another embodiment of the invention, the control block may contain temperature compensation means for controlling the velocity driver circuit to maintain the transducer at a temperature higher than the temperature of the fluid. That is, when the velocity circuit is enabled, the temperature of the transducer must be above the temperature of the fluid Otherwise, the heat transfer would be in the opposite direction. To ensure that the transducer's temperature remains above the fluid's, the CPU first determines the temperature of the fluid, and then, according to a resident algorithm, the appropriate voltage range across the transducer is determined. For example, the CPU would calculate a voltage range corresponding to a transducer's temperature approximately ten degrees above the fluid temperature. This determination may be made based on a calibrated transducer using a conversion equation, or it may be based upon theoretical values since the actual temperature of the transducer above the ambient fluid need not be precise. Finally, the velocity driver circuit functions to maintain the transducer within the determined voltage range.

User Interface

The user interface provides means for entering configuration and calibration information for the transducers, and for outputting or displaying the measurement data. Suitable interface devices include a key pad and display screen, a stand-alone computer linked via the IIC Bus, a remote controlled device using IR or RF, a modem, a stand-alone printer, a mouse and screen, a touch screen, and a disk or tape drive. Other interfaces should be obvious to one skilled in the art. The key-pad and display screen provide a simple embodiment of the interface. This circuitry is presently a mature technology, and therefore any off-the-shelf device would provide an adequate solution. It should suffice to say that the key-pad interface is an interrupt driven interface permitting immediate system response regardless of the ongoing activity. As shown in FIG. 2, the CPU 21 is shown with incoming lines on the left labelled INT to suggest interrupts generated by the user interface. The display interface operates in a slave mode. That is, when there is a message to be displayed, the message is simply written to a set of specific locations in the address space of the CPU 21. In the present embodiment, the LCD display has its own board controller, relieving the CPU 21 of all the display specific chores. The display controller can interpret commands and process data. These are basic commands such as clearing the display, moving the cursor position, and blinking the cursor if necessary.

Configuring the sensor circuitry within the each sensor channel is performed through the operator interface. In the preferred embodiment, this is accomplish using a graphical display which allows the user to move the curser along depictions of each sensor channel and configure it accordingly. In the temperature/velocity embodiment, for example, each channel may be configured to be off, temperature only, velocity only, or both temperature and velocity. The user selects a configuration mode by moving the cursor over its graphical representation and pressing an enter key. Entering the constants for the conversion equations is also performed using simple graph relationships. For example, the user selects the channel as described above, selects a calibration key, and then enters the appropriate conversion equation by responding to prompts. Alternatively, the calibration may be performed within the unit, in which case, the user simply instructs the unit which sensor (either external to the unit or within the sensor block) should be used as a calibration standard. Logic within the control block then performs the necessary calibration and the parameters are automatically stored in the EEPROM or other storage device.

Sensors

Figure 8A:
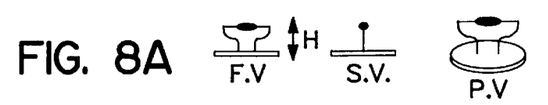
FIG. 8 shows a variety of pedestal mounted transducers;.
Figure 8B:
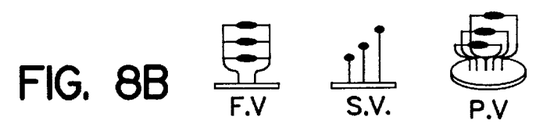
Figure 8C:
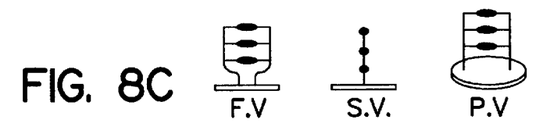
Figure 8D:
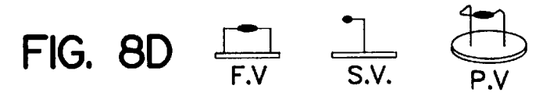
Figure 8E:
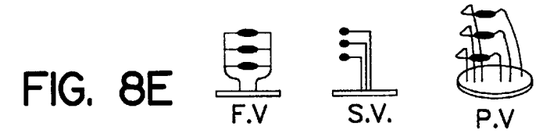

Theoretically, any transducer capable of producing an electrical signal representing a particular property to be measured is suitable. In the dual temperature/velocity measuring device embodiment, a transducer having a thermally sensitive resistance may be used, although a thermistor is the preferred due to its engineered sensitivity to temperature. Suitable sensor configurations include any traditional design, but a pedestal mounted transducer is preferred. FIG. 8 depicts the front, side and perspective views of various pedestal mounted transducers. A single transducer mounted on a pedestal is shown in FIG. 8a. FIGS. 8b and c both depict a multitransducer which provides velocity and temperature readings at different levels of fluid flow at a single sensor site. This enables a thermal or velocity gradient to be determined. In FIG. 8a, each transducer has an individual support, while a common support is shown in FIG. 8c. The latter embodiment may be preferred due to its lower cost. FIGS. 8d and 8e are similar to FIGS. 8a and c respectively except the supports in the former are bent, thereby allowing the transducer to extend past the pedestal if need be.

Figure 9:
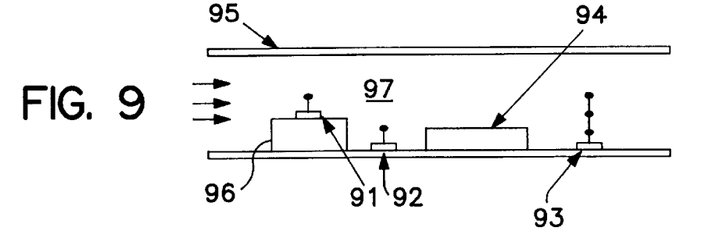
FIG. 9 shows various applications of the pedestal mounted transducers.

The pedestal mounted thermistors offer several benefits over the prior art. First, since thermistors tend to be more rugged then traditional wire resistors, such as tungsten, the need for replacement or repairs is greatly reduced. Second, the low profile pedestal mount results in minimal disturbance to the fluid flow. The traditional sensors on the other hand have a relatively long transducer support and large diameter lead wire that interferes with the fluid flow. Third, the pedestal may be mounted to the test site with double sided adhesives, including epoxy. This enables a sensor 91 to be mounted on an interior object 96 within the channel 97 of the fluid flow as shown in FIG. 9. Traditionally, sensors are mounted to the side wall 95 of the channel 97. Moreover, the adhesive mounting allows a sensor 92 to be positioned in a highly congested test area as FIG. 9 shows. The pedestal may also contain a transmitter to obviate the need for a lead wire. Suitable embodiments of this concept include IR and RF transmitters, and the transducer supports may even act as antennae. Having a wireless sensor further adds to its flexibility in mounting to interior obstacles or in congested areas. Finally, because a single pedestal mount 93 can support a multiplicity of thermistors (see FIGS. 8b, c, and e) a multiplicity of readings may be taken from a single site as shown in FIG. 9. Such readings may be helpful in determining the velocity or thermal gradient across the conduit 97.

Figure 10A:
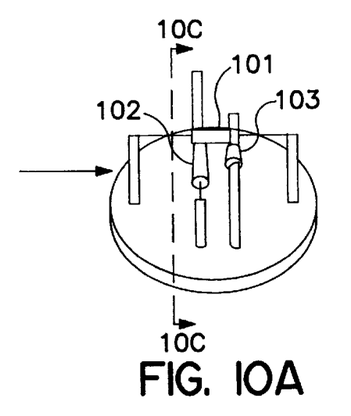
FIG. 10 shows a three dimensional multitransducer.
Figure 10B:
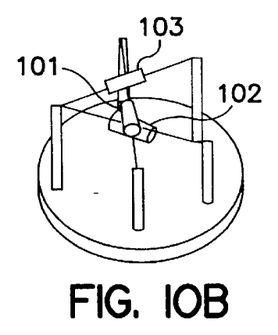
Figure 10C:
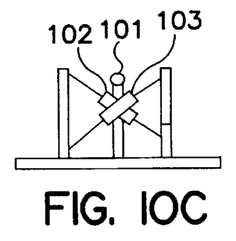

Having multiple transducers supported by a single pedestal enables the user to sense not only thermal and velocity gradients, but also the direction of the fluid flow. The power required to maintain a resistor at a certain temperature provides accurate information regarding the rate of cooling and therefore the rate of fluid moving past the resistor, but does indicate the direction of the flow. In other words, the magnitude of the velocity can be determined but not its direction. The multitransducer shown in FIG. 10 enables the system to calculate the direction of the fluid flow. As shown, the multitransducer comprises three thermistors 101, 102, and 103 positioned in the X, Y, and Z directions based upon the Cartesian coordinate system. This configuration necessarily exposes a certain portion of each thermistor to a particular direction of fluid flow. For example, in FIG. 10, if the fluid was from left to right, transducer 101 would only have its cross-section exposed to the direction of the flow, while transducer 102 would have its entire side exposed. Although the fluid flow would also be striking transducer 103 on its side, since a portion of its side is eclipsed by transducer 102, the effective area exposed to the fluid flow would be less. Since the heat transfer depends upon the amount of surface area exposed in the direction of the fluid flow, transducers 101, 102, 103 would have varying heat transfer values. The direction vector of the fluid flow can therefore be calculated using these values by decomposing the vector into its three components (X, Y, and Z) as represented by transducers 101–103. It is anticipated that calculating the vector would be performed in the firmware using known vector analysis programming techniques.

It should be understood that although the multitransducer described above may provide directional information about the fluid flow, such information could be obtained using a single probe if the magnitude of the velocity could be determined independently. That is, given the speed of the flow, its direction can be determined if the transducer is carefully calibrated. As discussed above, heat transfer depends upon the surface area exposed in the direction of the fluid flow; a transducer therefore provides different readings depending upon its orientation to the flow. If the transducer is carefully calibrated and if the velocity is known, then the orientation of the transducer to the flow can be determined. Many situations exist in which the rate of the fluid flow can be determined independent of the transducer. For example, fluid rate can be determined when other transducers are available, or when the cross-section of the conduit is known as well as the volume of fluid in and out of the conduit. In such situations, it may be the direction of the flow, e.g., eddies, that is of interest.

Obviously, numerous modifications and variations of the present invention are possible in the light of the above teachings. It is therefore understood that within the scope of the appended claims, the invention may be practiced otherwise than as specifically described herein.

What is claimed is:

1. A device for interfacing with a transducer to measure a certain property being sensed by the transducer, said device comprising:

at least one sensor block comprising:
      at least one terminal for electrically connecting to a transducer;
      at least one sensor channel having sensor circuitry electrically connected to said terminal, said sensor circuitry configured to cooperate with said transducer to generate an electrical signal representing a property being sensed by said transducer;
   a control block connected to said sensor block comprising:
      configuration means for enabling said sensor circuitry according to configuration information entered by a user;
      conversion means for converting said signal to a measurement value of said property; and
   user interface means for enabling a user to input said configuration information and for outputting said measurement value.

2. The device of claim 1, wherein said conversion means comprises a conversation equation for converting said signal to said measurement value, and wherein said conversion means is responsive to said configuration means such that said conversion equation corresponds to a particular configuration of said sensor circuitry.

3. The device of claim 1, wherein said user interface means comprises a display for displaying said measurement value.

4. The device of claim 2, wherein the control block further comprises:

calibration means for calibrating said signal to said measurement value, said calibration means generating said conversion equation based upon a number of signals of known measurement value.

5. A device for interfacing with a transducer to measure a property being sensed by the transducer, said device comprising:

at least one terminal for electrically connecting to said transducer;
   at least one sensor channel having a plurality of sensor circuits, a selection of said sensor circuits being enabled and electrically connected to said terminal, said selection of said sensor circuits being configured to cooperate with said transducer to generate an electrical signal representing said property as sensed by said transducer;
   configuration means for enabling said selection of said sensor circuits according to configuration information entered by a user;
   conversion means for converting said signal to a measurement value of said property; and
   user interface means for enabling a user to input said configuration information and for outputting said measurement value.

6. The device of claim 5, wherein said conversion means comprises a conversation equation for converting said signal to said measurement value, and wherein said conversion means is responsive to said configuration means such that said conversion equation relates to said selection of said sensor circuits.

7. The device of claim 5, wherein said user interface means comprises a display for displaying said measurement value.

8. The device of claim 6, wherein said sensor block further comprises:

memory means for storing calibration constants of said conversion equation.

9. The device of claim 6 having a plurality of terminals and a sensor channels for each termial; and further comprising:

multiplexing means for connecting said conversion means and said configuration means to a selected sensor channel.

10. The device of claim 8, wherein said conversion means is responsive to said configuration means such that said conversion equation relates to said selection, and wherein said conversion means queries said memory means for said calibration constants.

11. A device for measuring the temperature of a fluid and the velocity of its flow with a single transducer having a thermally sensitive resistance, said device comprising:

at least one sensor block having:
      at least one sensor channel having temperature and velocity driver circuits for cooperating with said transducer to generate a first and second signal respectively when enabled, said first signal representing the resistance of said transducer and said second signal representing the power requirements of maintaining said transducer at a certain temperature above the temperature of said fluid;
   a control block connected to said sensor block having:
      configuring means for enabling a combination of said temperature and velocity driver circuits;
      converting means for applying a temperature conversion equation to said first signal and a velocity conversion equation to said second signal to generate the temperature and velocity of said fluid respectively; and
   operator interface for inputting configuration information and for outputting the temperature and velocity measurement values of the fluid.

12. The device of claim 11, wherein said sensor block further comprises:

a multiplicity of sensor channels; and
   multiplexing means for enabling said control block to address each sensor channel individually.

13. The device of claim 12, wherein said multiplexer means comprises at least one multiplexer, said multiplexer assigning each sensor channel an address thus enabling said control block to scan a particular sensor channel by address and receive said first signal when said temperature driver circuit is enabled and said second signal when said velocity driver circuit is enabled.

14. The device of claim 13, wherein said sensor block further comprises:

memory means for storing calibration constants of said conversion equation.

15. The device of claim 11, wherein said sensor block further comprises:

memory means for storing calibration constants of said conversion equation.

16. The device of claim 15, wherein said conversion means is responsive to said configuration means such that said conversion equation relates to said selection, and wherein said conversion means queries said memory means for said calibration constants.

17. The device of claim 11, wherein said control block further comprises:

calibration means for calibrating said first and second signals to the temperature and velocity of said fluid respectively, said calibration means generating temperature and velocity conversion equations based upon a number of first and second signals of known measurement value.

18. The device of claim 11, wherein said control block further comprises:

temperature compensation means for ensuring that said velocity driver circuit maintains said transducer at a temperature higher than the temperature of said fluid.

19. The device of claim 11, further comprising:

at least one sensor having at least one transducer with a thermally dependent resistance.

20. The device of claim 19, wherein said transducer is a thermistor.

21. The device of claim 19, wherein said sensor has a planer pedestal for supporting said transducer and for providing a surface for mounting.

22. The device of claim 21, wherein said pedestal supports a multiplicity of transducers.

23. The device of claim 22, wherein each transducer is positioned to have a particular exposure in a particular direction, said exposure relating to a particular heat exchange and thus a particular voltage requirement; and wherein said control block has vector analysis means for analyzing said particular voltage requirement of each transducer to determine the direction of said fluid.

24. A device for interfacing with a transducer to generate a measurement value of a certain property, said device comprising:

at least one sensor block comprising:
at least one sensor channel having sensor circuitry, said sensor circuitry configure to cooperate with said transducer to generate an electrical signal representing said property;

a control block connected to said sensor block comprising:
configuration means for enabling said sensor circuitry;
conversion means for converting said signal to said measurement value using a conversion equation; and user interface means for inputting said measurement value;

at lease one sensor having at least one transducer, said sensor has a planer pedestal for supporting said transducer and for providing a surface for mounting.

25. The device of claim 24, wherein said pedestal supports a multiplicity of transducers.

26. A device for interfacing with a transducer to measure a property being sensed by the transducer, said device comprising:

at least one sensor block comprising:
a multiplicity of terminals for electrically connecting to said transducer;
a sensor channel for each terminal, each sensor channel having sensor circuitry electrically connected to a terminal, said sensor circuitry being configured to cooperate with said transducer to generate an electrical signal representing said property as sensed by said transducer;
multiplexing means for enabling a control block to address each sensor channel individually;

a control block electrically connected to said sensor block comprising:
configuration means for configuring said sensor circuitry according to configuration information entered by a user;
conversion means for converting said signal to said measurement value using a conversion equation; and user interface means for enabling a user to input configuration information and outputting said measurement value.

* * * * *